United States Patent [19]
Gattey et al.

[11] Patent Number: 5,553,312
[45] Date of Patent: Sep. 3, 1996

[54] DATA TRANSFER AND COMMUNICATION NETWORK

[75] Inventors: Phillip A. Gattey, Los Gatos; Dwight D. Lynn, Santa Cruz; Barry K. Yuen, Fremont, all of Calif.

[73] Assignee: ACS Wireless, Inc., Scotts Valley, Calif.

[21] Appl. No.: 262,596

[22] Filed: Jun. 20, 1994

[51] Int. Cl.⁶ .................................................. H04B 7/15
[52] U.S. Cl. ........................................... 455/11.1; 455/66
[58] Field of Search ............................. 455/11.1, 15, 20, 455/66, 88, 89; 381/41, 42; 235/383, 472; 186/38, 39; 340/286.09, 286.06, 286.07, 286.08, 306, 307; 364/188, 189

[56] References Cited

U.S. PATENT DOCUMENTS

| | | | |
|---|---|---|---|
| 3,281,789 | 10/1966 | Willcox et al. | 340/825.55 |
| 4,392,243 | 7/1983 | Ohhashi et al. | 455/89 |
| 4,415,065 | 11/1983 | Sandstedt | 186/39 |
| 4,418,277 | 11/1983 | Tremmel et al. | 235/472 |
| 4,462,080 | 7/1984 | Johnstone et al. | 364/919 |
| 4,491,699 | 1/1985 | Walker | 455/89 |
| 4,539,706 | 9/1985 | Mears et al. | 455/11.1 |
| 4,569,421 | 2/1986 | Sandstedt | 186/39 |
| 4,641,292 | 2/1987 | Tunnell et al. | 367/198 |
| 4,654,883 | 3/1987 | Iwata | 455/89 |
| 4,885,796 | 12/1989 | Loftus et al. | 455/89 |
| 4,916,441 | 4/1990 | Gombrich | 340/825.3 |
| 4,947,028 | 8/1990 | Gorog | 235/381 |
| 5,003,472 | 3/1991 | Perrill et al. | 364/401 |
| 5,054,112 | 10/1991 | Ike | 455/41 |
| 5,149,211. | 9/1992 | Pettigrew et al. | 400/88 |
| 5,208,449 | 5/1993 | Eastman et al. | 235/462 |
| 5,218,188 | 6/1993 | Hanson | 235/375 |
| 5,345,071 | 9/1994 | Dumont | 235/383 |
| 5,365,050 | 11/1994 | Worthington et al. | 235/472 |
| 5,371,901 | 12/1994 | Reed et al. | 455/69 |
| 5,377,097 | 12/1994 | Fuyama et al. | 364/401 |
| 5,389,917 | 2/1995 | LaManna et al. | 340/825.3 |
| 5,404,577 | 4/1995 | Zuckerman et al. | 455/89 |

FOREIGN PATENT DOCUMENTS

| | | |
|---|---|---|
| 0337283 | 10/1989 | European Pat. Off. . |
| 0531645 | 3/1993 | European Pat. Off. . |
| 4301824A1 | 3/1993 | Germany . |
| 41 35 496 | 4/1993 | Germany . |
| 2196766 | 5/1988 | United Kingdom ............. H04B 7/00 |
| 2229562 | 9/1990 | United Kingdom . |
| WO92/02084 | 2/1992 | WIPO ............................ H04B 7/15 |
| WO94/02908 | 2/1994 | WIPO . |

OTHER PUBLICATIONS

Copy of PCT Notification of Transmittal of the International Search Report or the Declaration, mailed Oct. 6, 1995, from the International Searching Authority, 7 pages in length.

*Primary Examiner*—Reinhard J. Eisenzopf
*Assistant Examiner*—Marsha D. Banks-Harold
*Attorney, Agent, or Firm*—Limbach & Limbach L.L.P.; Michael A. Stallman

[57] ABSTRACT

A data transfer and communication system is disclosed including a central station and a plurality of remote, relay terminals. Each relay terminal includes a data entry device such as a keypad or bar code wand. A headset is associated with each relay terminal. Circuitry is provided to permit two-way wireless communication between the headset, relay terminal and central station. The relay terminal functions to transmit substantially unprocessed voice and data signals to the central station. The central station analyzes the signals and can retransmit a response which can be displayed on the relay terminal. The relay terminals are intended to be high volume, low cost items with the more expensive computational power being located at the central station.

76 Claims, 4 Drawing Sheets

DATA TRANSFER AND COMMUNICATION NETWORK

TECHNICAL FIELD

The subject invention relates to system which allows remote users to transmit both Speech and data information to a remote processor for analysis. The system can be used in a wide variety of applications such as inventory control, security, sales and restaurants.

BACKGROUND OF THE INVENTION

In recent years, there have been significant advances in both wireless communication technology and computer processing technology. For example, both portable and cellular phones are now in wide use. There has also been some initial progress in developing wireless headset technology. In addition, with each passing year, computers are becoming smaller and more powerful. Recently, there has been a great effort to develop personal digital assistants (PDA's) which provide palm size computational ability.

Unfortunately, to date, PDA's have not met with significant commercial success. Even though the processing power in these small devices is remarkable, they are expensive, bulky and require a reasonable amount of computer knowledge to operate. Although these devices are often touted as being able to recognize handwritten data, the capabilities are still rudimentary since handwriting analysis requires significant processing capability and speed still unavailable in a portable device. In addition, it does not appear that any of the present PDA's include speech recognition systems since this feature would require even more processing power.

There has also been significant development in portable hand-held data entry communicators. The most ubiquitous of these devices now appear in restaurants. A waiter taking an order will enter a code into the device representing the order (often spelling the item chosen from the menu). When the customer requests a change to the standard offering, additional data entry is required which can take a significant amount of time. The information entered into the terminal is processed and then transmitted to the kitchen or bar, typically by infrared technology. The information is displayed so that the staff can fill the order.

This system allows the restaurant to control food inventory. However, it is cumbersome and cannot provide any data feedback to the waiter with information such as current availability, length of time to completion, or even permit questions or submission of special instructions concerning the order. In addition, the cost of the terminals is not insignificant since computational capability is required.

In view of the above, it is an object of the subject invention to create a system which allows both speech and data communication (including unprocessed transducer signals) between a remote location and a central station.

It is a further object of the subject invention to provide a system where a personal terminal functions for system access and as a relay for unprocessed voice and data information.

It is another object of the subject invention to provide a system where the computational capabilities of a remote, hand-held terminal are essentially eliminated so that the terminal can be lightweight and low in cost.

It is still a further object of the subject invention to provide a system where the central station can process data and transmit the result back to the remote terminal for display.

It is still a further object of the subject invention to provide a system which includes a headset for adding voice communication to the data transfer to improve efficiency and effectiveness.

It is still another object of the subject invention to provide speech recognition software in the central station for decoding analog voice signals into machine readable format.

It is still a further object of the subject invention to provide a system wherein the central station can reformat the decoded voice information for retransmission and display on the remote terminal.

SUMMARY OF THE INVENTION

In accordance with these and other objects, the subject invention includes a headset intended to be worn by the user and including a transducer for converting voice to electrical signals. Although there may be some applications where only one way voice communication is required, in the preferred embodiment, the headset will also include a transducer for converting electrical signals into audio signals. The headset will also include wireless transmit and receive circuitry.

The headset is intended to communicate a relatively short distance with a personal, hand-held relay terminal. The relay terminal will also include at least one data entry means. The data entry means could include items such as a keypad, bar code reader, magnetic stripe reader, temperature probe, etc. The terminal will also include a second set of wireless transmit and receive circuits designed to send and receive signals to and from a central station or controller. It is intended that the relay terminal send signals (voice or input data) to the central station which are substantially unprocessed. By unprocessed it is meant that the signals are not analyzed (with, for example, a microprocessor) for protocols, parity or information content. It is expected that the relay terminal will condition the signals to improve transmission such as with filtering or amplification. It is also expected that the information would be translated or encoded with circuits for voltage to frequency conversion or modulation and demodulation. However, the intent is to minimize the interpretation of information necessary within the relay terminal.

The subject invention further includes a central station or controller having transmit and receive circuitry for communicating with a plurality of relay terminals. The controller provides the primary processing power of the system. The hardware and software defining the controller will be based on the selected application. However, it is intended that the controller be supplied with unprocessed voice and data signals and that it be responsible for all calculation and analysis. By placing all intelligent processing activity at a remote location, the cost of providing processing power at each remote terminal is eliminated and the size of the remote terminals can be minimized.

In the preferred embodiment, the relay terminal will include some form of display. Information transmitted from the controller can be shown on the display. Various examples of the operation of the subject system in different environments will be discussed below with reference to the following drawings in which:

DETAILED DESCRIPTION OF THE PREFERRED EMBODIMENT

Figure 1:
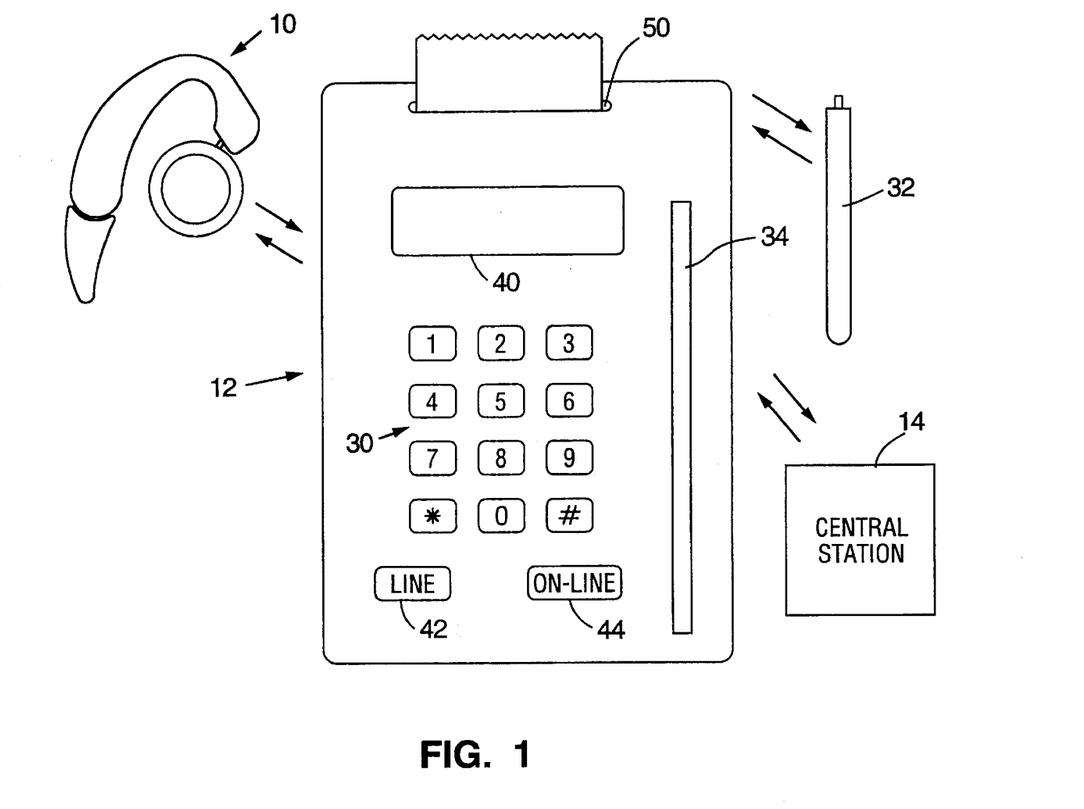
FIG. 1 is a block diagram of the voice and data communication system of the subject invention.

Turning first to FIG. 1, there is provided an illustration of the basic elements of the subject invention. These elements includes a headset 10, a relay terminal 12 and a central station or controller 14. In the preferred embodiment, the headset includes transducers for converting voice into an analog electrical signal and electrical signals into sound. One suitable headset is described in copending application Ser. No. 08/105,283, filed Jul. 30, 1993, and assigned to the same assignee herein and incorporated by reference. In the preferred embodiment, the headset can include a mastoid microphone to minimize weight and maximize comfort.

The headset 10 will also include circuitry for transmitting the electrical signals to and from the relay terminal 12. The type of circuitry which is selected will depend in large part on the environment and application, including the number of units in a given area. For example, communication can be conventional, low power, RF signals. Alternatively various forms of low frequency inductive coupling could be provided. Although communication over a hard wire electrical connection is simple, some form of wireless communication is preferred.

Relay terminal 12 will include complimentary circuitry for communicating with the headset 10. Terminal 12 will also include separate wireless communication circuitry for passing the voice signals to and from the central station 14. It is intended that relay terminal act primarily as a node through which these signals are passed. In this role, terminal 14 can demodulate the incoming signal from the headset and then remodulate the signal in the format used to communicate with the central station 14. Some additional amplification and filtering may be required.

The format used to communicate between the relay terminal 12 and the central station 14 will again be dependent upon the particular environment and application. For example, cellular type radio signals can be used to carry the voice signals. With the addition of a small sideband, data signals can be carried simultaneously. It is also possible to use other frequency bands or communicate with infra-red systems similar to present day remote restaurant message pads.

In accordance with the subject invention, the relay terminal also includes at least one direct data entry means. As illustrated in FIG. 1, one type of data entry means can be defined by a keypad 30. Another data entry means can be defined by a probe 32 which can be a bar code wand or a probe for monitoring parameters such as temperature, pressure or electrical characteristics. The data entry means may be hard wired to the terminal or communicate with wireless technology. In a retail environment, it would also be desirable to include a magnetic stripe reader 34. As discuses below with reference to FIG. 6, the terminal can also include a pen/pad input.

Each of these data entry means will generate either analog or digital electrical data signals which are fed into the terminal. As with the voice signals, the primary function of the relay terminal is to relay these signals to the central station 14 in substantially unprocessed form.

The central station 14 will include transmit and receive circuitry for communicating with the terminal 12. Since the central station can be at a fixed location, it can be easily provided with significant computational capabilities. The signals received from the terminal 12 can be decoded, analyzed and a response retransmitted back to the relay terminal in a very short period of time. It is envisioned that the total elapsed time between the start of the transmission of the signal from the terminal 12 to the central station 14, the processing of that signal, and return of a responsive signal to the display 40 of the terminal can be performed in under ten milliseconds. At this speed, the operation of the system should be perceived as essentially equivalent to what could be achieved if the processing power were located in the terminal itself.

Figure 2:
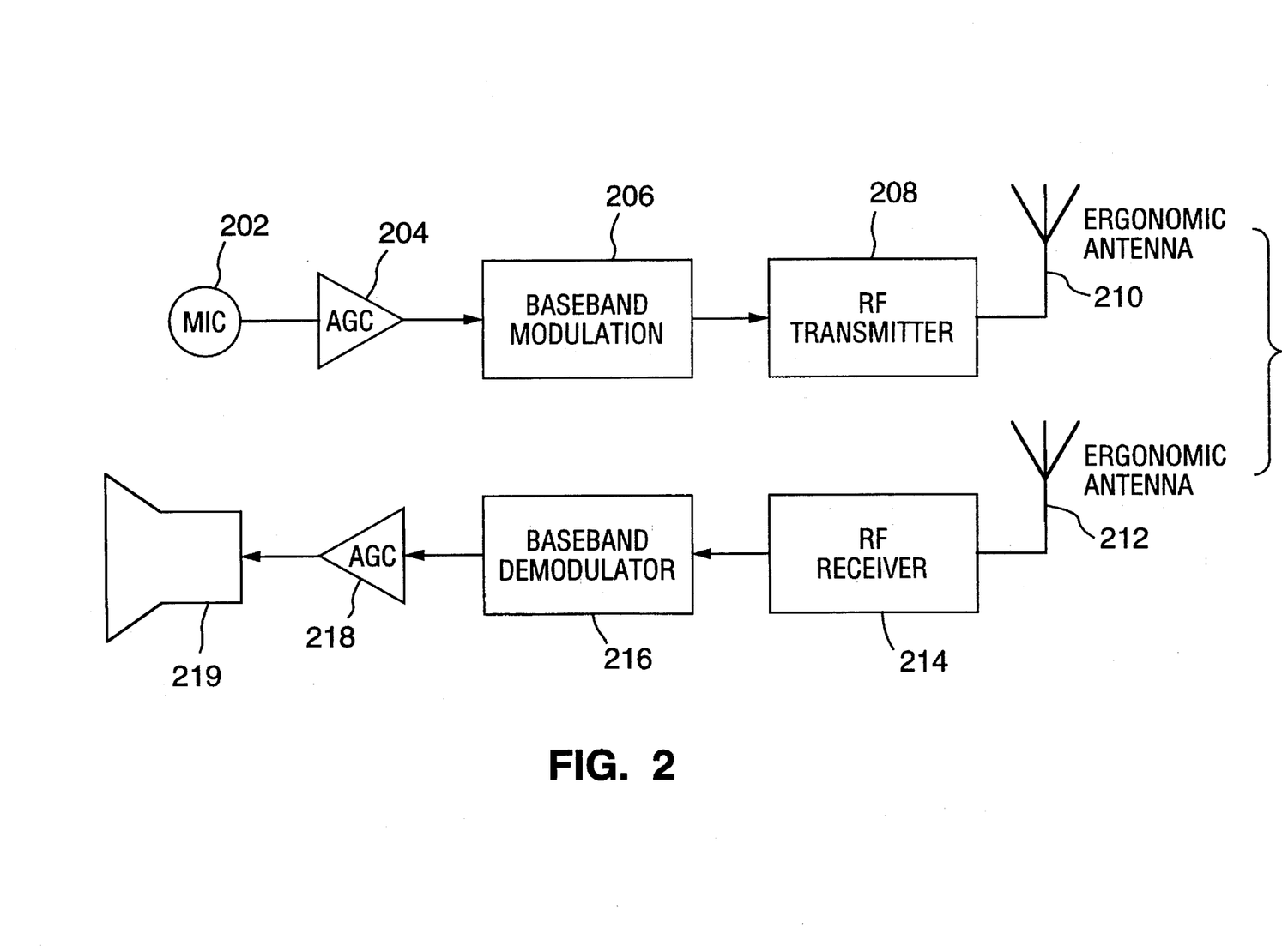
FIG. 2 is a block diagram of the circuitry used in the headset.

FIGS. 2 through 5 are block diagrams of the preferred circuitry for the components of the subject system. FIG. 2 illustrates the circuits in the headset 10. As shown therein, signals from a microphone 202 are supplied to an automatic gain control circuit 204. The output from the AGC circuit is supplied to a base band modulation circuit 206 for modulating the signal in the desired format. The output from circuit 206 is up converted by RF transmitter 208 and delivered to an antenna 210.

The return voice signals are picked up by an antenna 212. Depending on the transmission scheme selected, a single antenna could be used for transmission and reception. The received signal is down converted by an RF receiver 214. The signal is then demodulated by circuit 216, passed through an AGC circuit 218 to a speaker 219.

Figure 3:
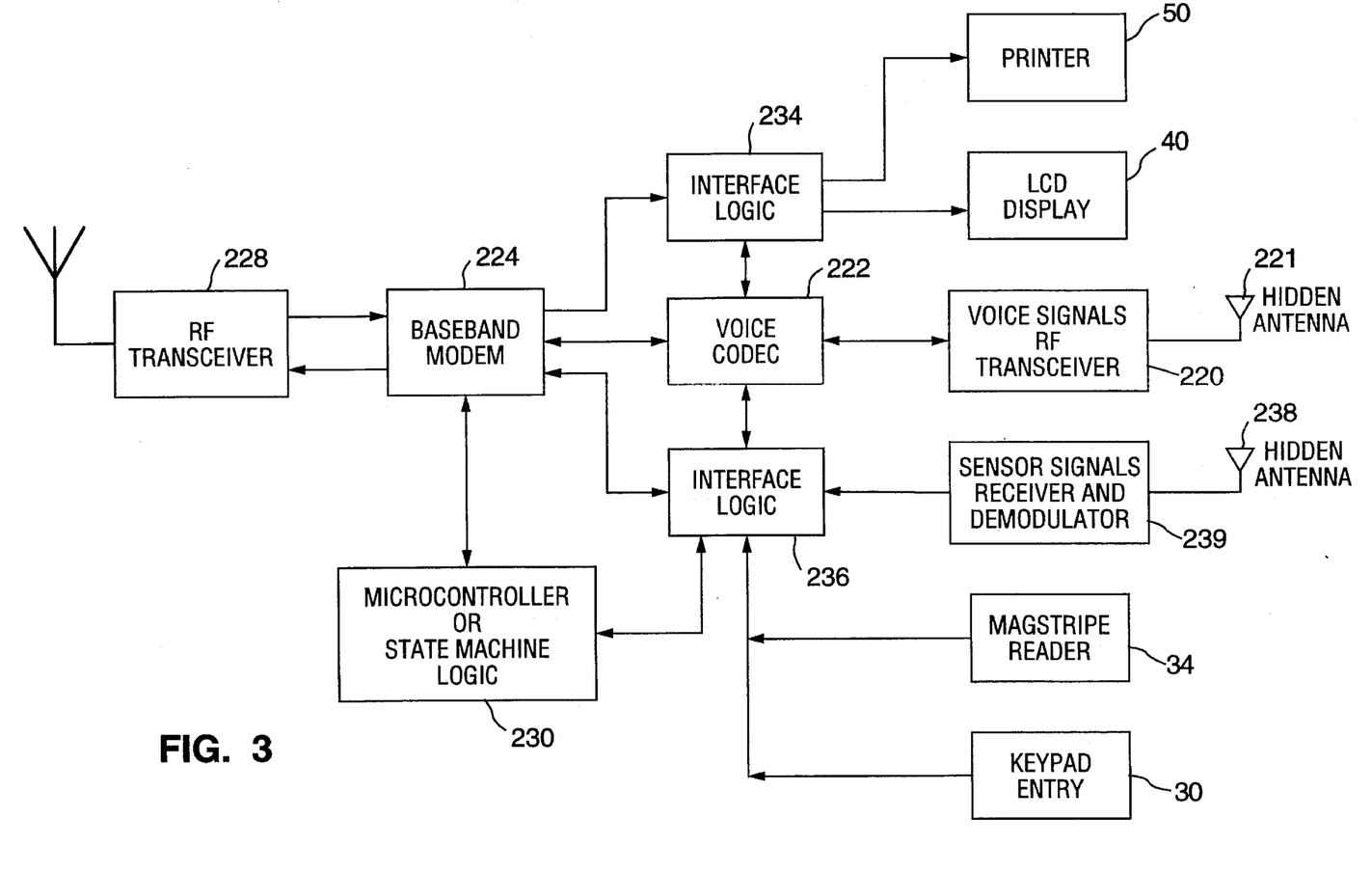
FIG. 3 is a block diagram of the circuitry used in the local relay terminal.
Figure 4:
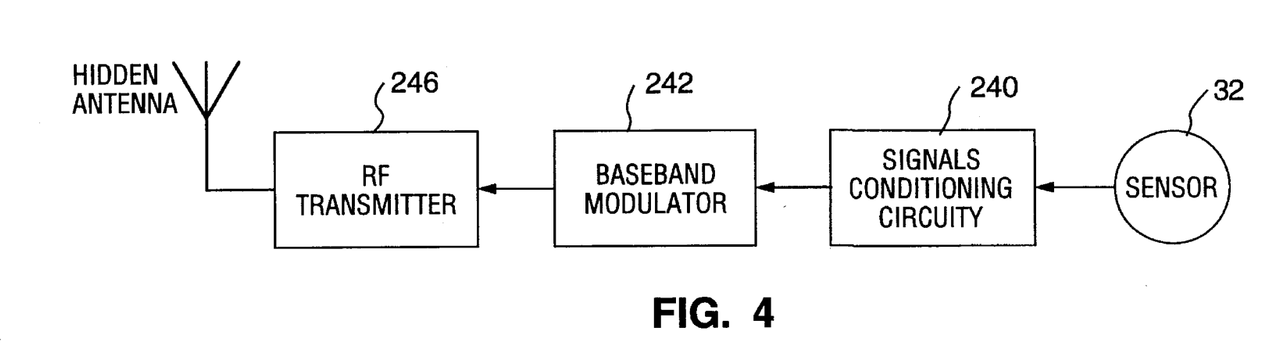
FIG. 4 is a block diagram of the circuitry used in a wireless data entry means.

As shown in FIG. 3, the relay terminal 12 includes complementary RF transceiver 220 and antenna 221 for communicating with the headset 10. The signals are passed through a voice Codec 222 for modulation and retransmission by a modem 224 and transceiver 228. The relay terminal includes a simple, low cost microcontroller or state machine logic 230 for controlling the internal logic functions and transferring and presenting data. Inputs from the keypad 30, magstripe reader 34, LCD display 40 and printer 50 are passed through various interface logic blocks 234 and 236 and are then transmitted to the central station by transceiver 228.

Where the data entry sensor is wireless, the terminal is provided with an extra antenna 238 and a composite receiver and demodulator 239 capture and carry the input signals to the interface logic 236. As shown in FIG. 4, the wireless data sensor 32 can include conditioning circuitry 240 as well as a modulator 242 and transmitter 246.

Figure 5:
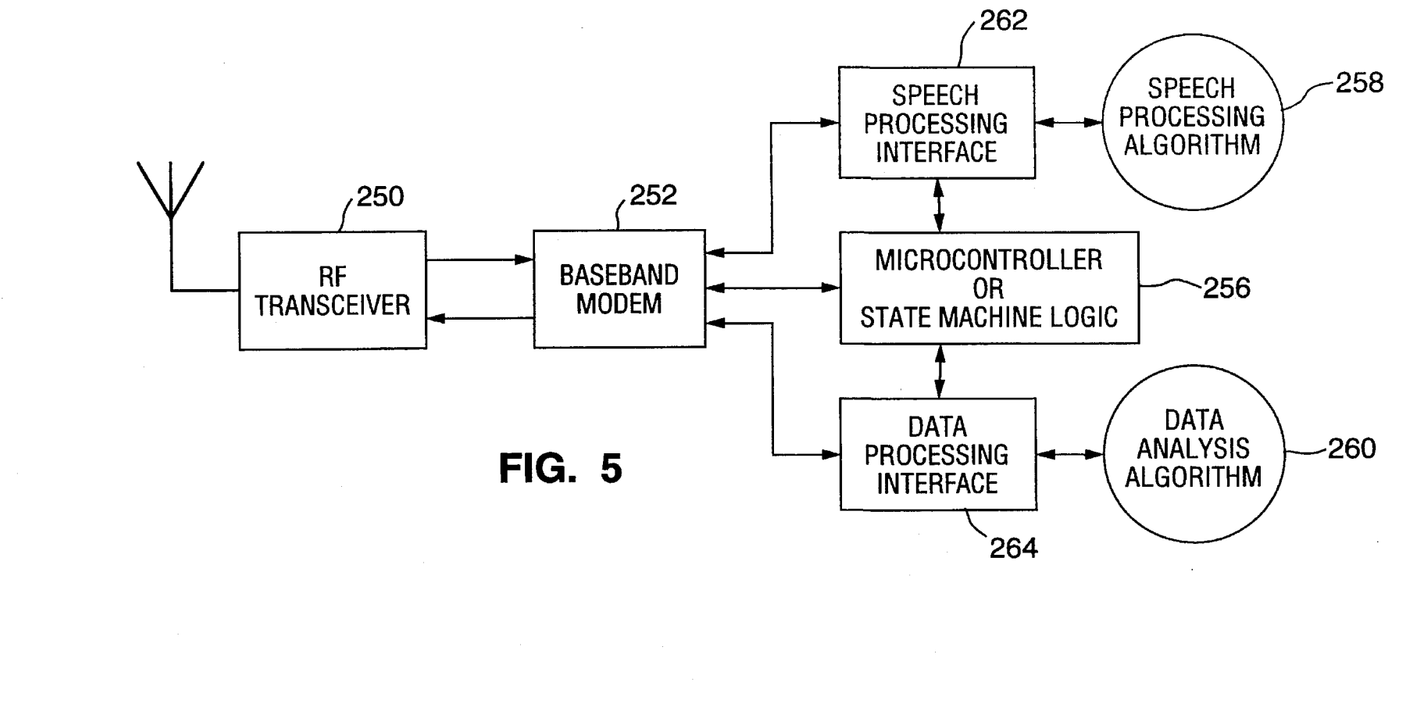
FIG. 5 is a block diagram of the circuitry used in the central station.

As shown in FIG. 5, the central station 14 includes an RF transceiver 250 and modem 252 designed to communicate with the terminal 12. The central station includes a microcontroller or state machine logic 256 for handling overall system operation. This central processor can be PC based. Separate processing modules based on a computer of some type 258 and 260 can be provided to handle both data and voice analysis. These modules communicate with the system through separate interfaces 262 and 264.

In the preferred embodiment, the speech processing module includes speech recognition software. By this arrangement, simple commands from the user could be decoded and processed. Voice commands could be used to annotate data entered into the terminal through the keypad or probe.

For example, in a restaurant situation, the waiter might punch a numeric code for a steak dinner. This numeric code will be transmitted to the central station which will process the code and return a signal so that "steak dinner" is shown on display 40. The waiter may activate the headset by pressing a line button 42 on the terminal and speak the phrase "slice it please" into the headset. The analog data will be transmitted from the headset, through the terminal to the central station 14. The speech recognition software in the central station will decode information, generate a responsive signal so that the phrase "slice it please" will be displayed on the terminal. Further voice input to the main order could include the side dish "fries" and the type of salad dressing "ranch." Each of these terms could be encoded by the central station and transmitted back for verification at the terminal. Of course, the order would also be forwarded and displayed to the kitchen staff.

In a variation and simplification of this approach, (where speech recognition is not provided), the waiter could have a menu list with associated bar codes. When the customer orders a dish, the waiter will simply scan the associated bar code with probe 32. If there are variations, the waiter will hit a key 44 initiating a recording. The waiter will recite the details of the order which are then relayed by the terminal to the central station and stored. When the cook is about to prepare a dish, the order will include a notation that additional instructions are stored. The cook can then press a button and replay the information spoken by the waiter. Thus, the special order is relayed to the cook without the waiter ever having to write it down or physically walk to the kitchen.

In the preferred embodiment, the waiter can also take payment right at the table. More specifically, the waiter can run a credit card through the magnetic stripe reader 34 which records the card number. The waiter or system software can then enter a dollar amount representing the cost of the meal. This data is relayed to the central station where the transaction is processed and validated. Upon completion, a signal is resent to the terminal 12. In this environment, it would be possible to provide the terminal with a low cost printer 50 for generating a customer receipt.

The speech recognition feature can be used in a variety of other applications. For example, when the probe is used for bar code scanning, the user could transmit information about products being scanned. A store clerk moving through the aisles could scan the bar code of the product and announce the number of those products remaining on the shelf at that time. This information could be decoded by software and stored at the central station. Alternatively, a quality control inspector can input the bar code for the product under examination and then describe the condition of the product, such as "pass" or "fail." This information can be used to route the product to the next stage or to the reject bin.

Figure 6:
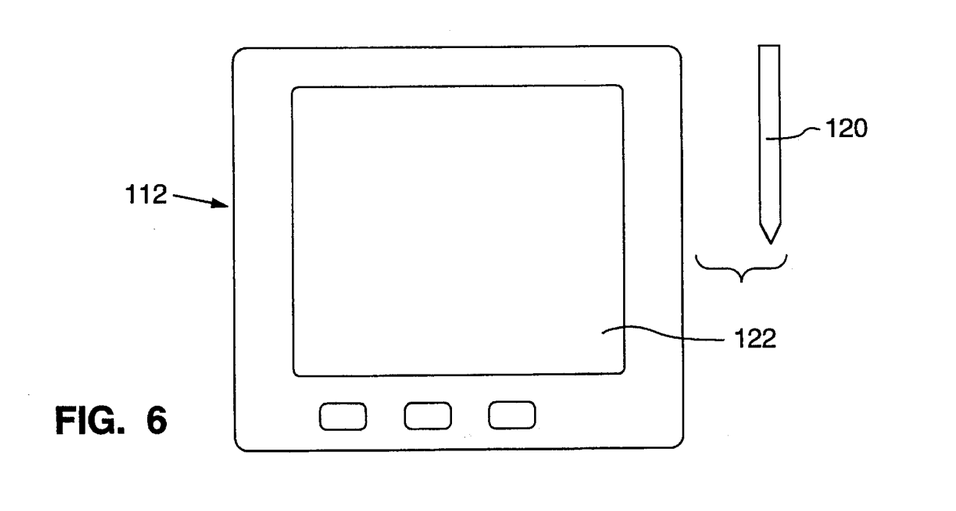
FIG. 6 is an illustration of a terminal having a pen/pad data input screen.

The subject system can also be used to overcome some of the problems with present day PDA's. FIG. 6 illustrates a terminal 112 which has the outward appearance of a conventional PDA. This device includes a pen/pad input 120–122 wherein the movement of the pen on the pad is detected. In existing systems, attempts are made to analyze this complex data using the processing power within the PDA. Because of the limited space and cost requirements, satisfactory operation is difficult to achieve. However, with the present system, the raw data from the pen/pad 120–122 is transmitted to the central station 14. At this location, the processing power of a work station could be called into play to decode the pen strokes into alphanumeric characters. This decoded information is than immediately retransmitted back to the terminal 112 for display. As above, handwritten notes could be annotated by voice input from the headset 10. The data written by the user would be stored at the central station for future retrieval.

In a system which includes a data screen of the type shown in FIG. 6, most of the input switches shown in FIG. 1 could be eliminated. Once the system is activated, the central station 14 can generate a menu with icons in a "windows-like" display. The user will use the pen input like a mouse to click and select menu items. Once again, all of the intelligent processing will take place in the central station with the terminal 112 only acting as a relay or display.

One example where this might be useful would be in law enforcement and traffic ticketing. The officer can communicate with a dispatcher regarding driver's license and license plate information. In this case, the terminal would be provided with cellular type communication with the central station. Using a menu driven system, the officer could enter ticket information such as location, speed, and nature of the violation. All of this information would be processed at the central station.

The subject system could also be used in a variety of emergency services applications. For example, paramedics could use the combination of voice and data entry to speak to dispatchers and obtain routing instructions. The remote terminal can be used to input data related to a patient's condition so that an "expert system" could provide quick diagnosis of potential problems and provide suggested intervention.

Various types of repairmen could obtain benefits with the system. The headset provides instant access to dispatchers and supervisors for answering technical questions. The terminal can be used to enter information about the make and model of a malfunctioning device. The central station can be programmed to respond with a description of suitable replacement parts.

Another application of the operation of the subject system would be in retail sales. For example, a shoe salesperson could be provided with a headset and terminal. When a customer requests a certain shoe, the salesperson can enter the model number into the terminal (either through a keypad or by scanning a bar code imprinted on the floor model.) This information would be relayed to the central station which can generate a display indicating which colors and sizes are available on site. In addition, the central station could be linked through a network to other stores so that shoe availability at other locations could be investigated.

The headset can also play an important role in this application. For example, the salesperson could use the headset to make voice contact with a central dispatcher or salesperson at another store without seeking out a separate telephone. The inputs to the keypad could be used as a dialer. Without ever having to leave the side of the customer, the salesperson can arrange to find the desired size and color shoe and have the shoe shipped to the store or even the home of the customer.

It should be appreciated from many of these various applications that the subject system can provide significant savings in time and labor for a work force. In addition, productivity can be improved and therefore costs lowered. Moreover, high powered, sophisticated computational power can be placed in the hands of a large work force at low cost. By concentrating the computing power at a single remote location and distributing low cost relay terminals, each employee can be provided with access to the important information.

While the subject invention has been described with reference to the preferred embodiments, various changes and modifications could be made therein, by one skilled in the art, without varying from the scope and spirit of the subject invention as defined by the appended claims.

We claim:

1. A data transfer and communications system comprising:

a headset including means for transmitting analog voice signals;

a hand-held relay terminal having means for receiving analog voice signals from the headset, said terminal including at least one data entry means, said terminal further including means for the wireless transmission of voice and data signals which are not processed other than for a purpose related to the transmission thereof; and a central controller having means for receiving the voice and data signals from the terminal, said controller further including a processor for analyzing the voice and data signals received from the terminal.

2. A system as recited in claim 1 wherein said controller includes a means for transmitting data signals back to said terminal and wherein said terminal includes a means for displaying the signals transmitted by the controller.

3. A system as recited in claim 1 wherein said controller includes a means for transmitting voice signals back to said terminal and said terminal includes a means for transmitting voice signals back to said headset to allow two way analog voice communication between the central controller and the headset.

4. A system as recited in claim 1 wherein the means for transmitting the voice signals between the headset and the relay terminal includes RF signals.

5. A system as recited in claim 1 wherein the means for transmitting the voice signals between the headset and the relay terminal includes inductive coupling.

6. A system as recited in claim 1 wherein the means for transmitting the voice and data signals between the relay terminal and the central controller includes RF signals.

7. A system as recited in claim 1 wherein the means for transmitting the voice and data signals between the relay terminal and the central controller includes infrared signals.

8. A system as recited in claim 1 wherein the means for transmitting the voice and data signals between the relay terminal and the central controller includes cellular communications.

9. A system as recited in claim 1 wherein said central controller includes a speech recognition means for decoding the analog voice information.

10. A system as recited in claim 1 wherein the data entry means of the relay terminal is defined by a keypad.

11. A system as recited in claim 1 wherein the data entry means of the relay terminal is defined by a bar code scanner.

12. A system as recited in claim 1 wherein the data entry means of the relay terminal is defined by a magnetic stripe reader.

13. A system as recited in claim 1 wherein the data entry means of the relay terminal is defined by a pen-pad input.

14. A system as recited in claim 1 wherein said relay terminal includes circuits for conditioning the voice and data signals prior to transmission.

15. A system as recited in claim 1 wherein said relay terminal includes circuits for translating the voice and data signals prior to transmission.

16. A data transfer and communications system comprising:

a headset including means for transmitting and receiving analog voice signals;

a hand-held relay terminal having means for transmitting and receiving analog voice signals to and from the headset, said terminal including at least one data entry means, said terminal further including means for the wireless transmission and reception of voice and data signals which are not processed other than for a purpose related to the transmission thereof; and a central controller having means for transmitting and receiving the voice and data signals to and from the terminal, said controller including a speech recognition means for decoding the voice signals, said controller further including a processor for analyzing the decoded voice signals and the data signals received from the terminal.

17. A system as recited in claim 16 wherein said terminal includes a display and wherein said controller functions to reformat the decoded voice signals and retransmit the reformatted voice signals back to the terminal in a format which can be shown on the display.

18. A system as recited in claim 16 wherein the means for transmitting the voice signals between the headset and the relay terminal includes RF signals.

19. A system as recited in claim 16 wherein the means for transmitting the voice signals between the headset and the relay terminal includes inductive coupling.

20. A system as recited in claim 16 wherein the means for transmitting the voice and data signals between the relay terminal and the central controller includes RF signals.

21. A system as recited in claim 16 wherein the means for transmitting the voice and data signals between the relay terminal and the central controller includes infrared signals.

22. A system as recited in claim 16 wherein the means for transmitting the voice and data signals between the relay terminal and the central controller includes cellular communications.

23. A system as recited in claim 16 wherein the data entry means of the relay terminal is defined by a keypad.

24. A system as recited in claim 16 wherein the data entry means of the relay terminal is defined by a bar code scanner.

25. A system as recited in claim 16 wherein the data entry means of the relay terminal is defined by a magnetic stripe reader.

26. A system as recited in claim 16 wherein the data entry means of the relay terminal is defined by a pen-pad input.

27. A system as recited in claim 16 wherein said relay terminal includes circuits for conditioning the voice and data signals prior to transmission.

28. A system as recited in claim 16 wherein said relay terminal includes circuits for translating the voice and data signals prior to transmission.

29. A system as recited in claim 1 wherein said transmission means includes circuits for voltage to frequency conversion of the voice and data signals.

30. A system as recited in claim 1 wherein said transmission means includes circuits for modulating and demodulating the voice and data signals.

31. A system as recited in claim 1 wherein said relay terminal includes circuits for filtering the voice and data signals.

32. A system as recited in claim 1 wherein said relay terminal includes circuits for amplifying the voice and data signals.

33. A system as recited in claim 1 wherein the transmission of said voice signals between the headset and the relay terminal is wireless.

34. A system as recited in claim 16 wherein said transmission means in said relay terminal includes circuits for voltage to frequency conversion of the voice and data signals.

35. A system as recited in claim 16 wherein said transmission means in said relay terminal includes circuits for modulating and demodulating the voice and data signals.

36. A system as recited in claim 16 wherein said relay terminal includes circuits for filtering the voice and data signals.

37. A system as recited in claim 16 wherein said relay terminal includes circuits for amplifying the voice and data signals.

38. A system as recited in claim 16 wherein the transmission of said voice signals between the headset and the relay terminal is wireless.

39. A data transfer and communications system comprising:

a headset including means for transmitting analog voice signals;

a hand-held relay terminal having means for receiving analog voice signals from the headset, said terminal including at least one data entry means, said terminal further including means for the wireless transmission of voice and data signals and wherein said voice and data signals are transmitted without performing any analysis of the information content of said signals; and a central controller having means for receiving the voice and data signals from the terminal, said controller further including a processor for analyzing the voice and data signals received from the terminal.

40. A system as recited in claim 39 wherein said controller includes a means for transmitting data signals back to said terminal and wherein said terminal includes a means for displaying the signals transmitted by the controller.

41. A system as recited in claim 39 wherein said controller includes a means for transmitting voice signals back to said terminal and said terminal includes a means for transmitting voice signals back to said headset to allow two way analog voice communication between the central controller and the headset.

42. A system as recited in claim 39 wherein the means for transmitting the voice signals between the headset and the relay terminal includes RF signals.

43. A system as recited in claim 39 wherein the means for transmitting the voice signals between the headset and the relay terminal includes inductive coupling.

44. A system as recited in claim 39 wherein the means for transmitting the voice and data signals between the relay terminal and the central controller includes RF signals.

45. A system as recited in claim 39 wherein the means for transmitting the voice and data signals between the relay terminal and the central controller includes infrared signals.

46. A system as recited in claim 39 wherein the means for transmitting the voice and data signals between the relay terminal and the central controller includes cellular communications.

47. A system as recited in claim 39 wherein said central controller includes a speech recognition means for decoding the analog voice information.

48. A system as recited in claim 39 wherein the data entry means of the relay terminal is defined by a keypad.

49. A system as recited in claim 39 wherein the data entry means of the relay terminal is defined by a bar code scanner.

50. A system as recited in claim 39 wherein the data entry means of the relay terminal is defined by a magnetic stripe reader.

51. A system as recited in claim 39 wherein the data entry means of the relay terminal is defined by a pen-pad input.

52. A system as recited in claim 39 wherein said relay terminal includes circuits for conditioning the voice and data signals prior to transmission.

53. A system as recited in claim 39 wherein said relay terminal includes circuits for translating the voice and data signals prior to transmission.

54. A system as recited in claim 39 wherein the transmission of said voice signals between the headset and the relay terminal is wireless.

55. A system as recited in claim 39 wherein the relay terminal includes circuits for filtering the voice and data signals.

56. A system as recited in claim 39 wherein said relay terminal includes circuits for amplifying the voice and data signals.

57. A system as recited in claim 16 wherein said transmission means in said relay terminal includes circuits for voltage to frequency conversion of the voice and data signals.

58. A system as recited in claim 16 wherein said transmission means in said relay terminal includes circuits for modulating and demodulating the voice and data signals.

59. A data transfer and communications system comprising:

a headset including means for transmitting and receiving analog voice signals;

a hand-held relay terminal having means for transmitting and receiving analog voice signals to and from the headset, said terminal including at least one data entry means, said terminal further including means for the wireless transmission and reception of voice and data signals and wherein said voice and data signals are transmitted without performing any analysis of the information content of said signals; and a central controller having means for transmitting and receiving the voice and data signals to and from the terminal, said controller including a speech recognition means for decoding the voice signals, said controller further including a processor for analyzing the decoded voice signals and the data signals received from the terminal.

60. A system as recited in claim 59 wherein said terminal includes a display and wherein said controller functions to reformat the decoded voice signals and retransmit the reformatted voice signals back to the terminal in a format which can be shown on the display.

61. A system as recited in claim 59 wherein the means for transmitting the voice signals between the headset and the relay terminal includes RF signals.

62. A system as recited in claim 59 wherein the means for transmitting the voice signals between the headset and the relay terminal includes inductive coupling.

63. A system as recited in claim 59 wherein the means for transmitting the voice and data signals between the relay terminal and the central controller includes RF signals.

64. A system as recited in claim 59 wherein the means for transmitting the voice and data signals between the relay terminal and the central controller includes infrared signals.

65. A system as recited in claim 59 wherein the means for transmitting the voice and data signals between the relay terminal and the central controller includes cellular communications.

66. A system as recited in claim 59 wherein the data entry means of the relay terminal is defined by a keypad.

67. A system as recited in claim 59 wherein the data entry means of the relay terminal is defined by a bar code scanner.

68. A system as recited in claim 59 wherein the data entry means of the relay terminal is defined by a magnetic stripe reader.

69. A system as recited in claim 59 wherein the data entry means of the relay terminal is defined by a pen-pad input.

70. A system as recited in claim 59 wherein said relay terminal includes circuits for conditioning the voice and data signals prior to transmission.

71. A system as recited in claim 59 wherein said relay terminal includes circuits for translating the voice and data signals prior to transmission.

72. A system as recited in claim 59 wherein the transmission of said analog signals between the headset and the relay terminal is wireless.

73. A system as recited in claim 59 wherein said relay terminal includes circuits for filtering the voice and data signals.

74. A system as recited in claim 59 wherein said relay terminal includes circuits for amplifying the voice and data signals.

75. A system as recited in claim 59 wherein said transmission means in said relay terminal includes circuits for modulating and demodulating the voice and data signals.

76. A system as recited in claim 59 wherein said transmission means in relay terminal includes circuits for voltage to frequency conversion of the voice and data signals.

* * * * *